UNITED STATES PATENT OFFICE.

FREDERICK D. WILLEY, OF CHICAGO, ILLINOIS, ASSIGNOR TO CHICAGO VARNISH COMPANY, OF CHICAGO, ILLINOIS, A CORPORATION.

COMPOSITION OF MATTER TO BE USED FOR SURFACE COATING OF WOOD, METAL, OR OTHER MATERIAL.

1,004,125.     Specification of Letters Patent.     Patented Sept. 26, 1911.

No Drawing.     Application filed January 4, 1909. Serial No. 470,567.

*To all whom it may concern:*

Be it known that I, FREDERICK D. WILLEY, a citizen of the United States, and a resident of Chicago, in the county of Cook and State of Illinois, have invented a new and useful Composition of Matter to be Used for the Surface Coating of Wood, Metal, or other Material, of which I do declare the following to be a specification.

The composition forming the subject-matter of this application is intended more particularly for producing an exceedingly smooth and durable surface on such work as railway coaches, vehicles of all descriptions, furniture and the like, and is more especially designed for use in connection with a composition which forms the subject-matter of an application for Letters Patent executed by me of even date herewith Serial No. 470,642. In said companion application, the composition or mixture which forms the subject-matter of the present application, is therein designated as "Mixture No. 2," and the mixture in connection with which it is more particularly intended for use is designated in said companion application as "Mixture No. 1."

In the painting of the bodies of railway coaches and in like work, it is customary to first apply to the surface of the wood an oil primer and, after the same has been allowed to dry and after the cracks and defects have been puttied up, to apply a coat of flat lead and thereafter to apply from three to six coats of "rough stuff" and a coat of lead (ground color), and a final coat of flat color, leaving ample time (at least a day) for the successive coats to dry and for rubbing down the surface of the work.

In using my improved mixture, a very considerable saving in time, labor and material is effected, and a far more durable and satisfactory surface is secured.

The composition or mixture which forms the subject of this application is preferably made of the following ingredients:

| | |
|---|---|
| Aluminum powder | 2 oz. |
| Keg white lead | 1 lb. |
| Dry white lead | 1½ lbs. |
| Pumice flour | 2 oz. |
| A pigment of silica and clay (commercially known as "Keystone filler") | 3 lbs. |
| A pigment of silica and clay (commercially known as "English filler") | 1½ lbs. |
| Durable coach varnish | 1 qt. |
| Durable japan | 1 qt. |
| Turpentine | 1 qt. |

The "Keystone filler" above referred to, is a dark gray pigment mined in Pennsylvania, and the "English filler" is similar thereto, but has less silica and more clay than the "Keystone filler." If the surface to be produced is to be white, then the "Keystone filler" and "English filler" above referred to will be omitted, and the following ingredients will be substituted therefor, viz:

| | |
|---|---|
| A high grade calcium carbonate, (such as is commercially known as silver white) | 2½ lbs. |
| Asbestine pulp | 1½ lbs. |

It is obvious that the proportions above set forth may be varied and that recognized equivalents may be substituted for the ingredients specified. Thus, while I prefer to use aluminum powder, it would still be within the scope of my invention to use a bronze powder containing a comparatively small percentage of aluminum, such, for example, as a bronze powder consisting of, say, ninety per cent. copper and ten per cent. aluminum. A metal powder, such as above specified, gives great durability to the surface and adds materially to the flowing and leveling qualities of the mixture.

By "durable coach" varnish and "durable japan" is meant a high grade varnish and high grade japans, such as are usually employed upon railway cars, carriages and the like, and such a high grade varnish and japan are preferably employed in the composition.

In using the composition forming the subject-matter of this application, I first apply to the surface to be coated a coating of the following mixture which forms the subject-matter of the above mentioned companion application and is therein designated as "Mixture No. 1," viz:

| | |
|---|---|
| Aluminum powder | 2 oz. |
| Keg white lead | 2 lbs. |
| Dry white lead | 2 lbs. |
| Raw linseed oil | 1 pt. |

| | |
|---|---|
| Durable coach varnish | 3 pts. |
| Durable japan | 1 pt. |
| Turpentine | 1 qt. |
| Mineral pigment (such as red or brown hematite) from 4 oz. to 2 lbs., if it is desired to impart a color to the coating. | |

Having first applied to the surface to be coated said last mentioned "Mixture No. 1" and having allowed two days for the same to dry and for the puttying up of cracks, etc., the mixture forming the subject of the present application will be applied by means of brushes. Preferably, and for the better class of work, three successive coats of such mixture will be applied on the third, fourth and fifth days after the mixture designated as "Mixture No. 1" has been applied; on the sixth day the work will be rubbed down with pumice or with sand paper and water, and on the seventh day the surface color may be applied in the usual manner. For lower grades of work, fewer coats of my improved mixture need be used, and a corresponding saving of time will be effected.

It will be seen that the composition or mixture forming the subject of this application is similar to the mixture forming the subject of my above mentioned companion application, and I do not wish to be understood as claiming herein any subject-matter claimed in said application. I have found in practice that the mixture hereinafter claimed produces a surface of great durability, toughness and hardness; that the mixture has extraordinary leveling and flowing qualities and quickly dries or sets; that the "tooth" or cutting surface produced by the mixture is of such character that it is most effectively acted upon by pumice or sand paper, when being rubbed down, and that the coating resulting from its use is highly elastic and waterproof and thus most effectively serves to protect the work which it covers.

Having thus described my invention, what I claim as new, and desire to secure by Letters Patent, is:

1. A composition of matter comprising aluminum powder, white lead, pumice flour, a pigment of silica and clay, varnish and japan, substantially as and for the purpose specified.

2. A composition of matter consisting of aluminum powder, white lead, pumice flour, a pigment of silica and clay, varnish, japan and turpentine, substantially as and for the purpose specified.

3. A composition of matter, consisting of aluminum powder two ounces, white lead ground in oil one pound, dry white lead one and a half pounds, pumice flour two ounces, Keystone filler three pounds, English filler one and a half pounds, varnish one quart, japan one quart and turpentine one quart, substantially as and for the purpose specified.

4. A composition of matter comprising metallic powder, white lead, pumice flour, a pigment, and varnish, substantially as and for the purpose specified.

FREDERICK D. WILLEY.

Witnesses:
CLARA A. NORTON,
KATHARINE GERLACH.

---

Copies of this patent may be obtained for five cents each, by addressing the "Commissioner of Patents, Washington, D. C."